Dec. 20, 1955 R. C. RUHLAND 2,728,042

CONTROL CIRCUITS

Filed Dec. 24, 1951

INVENTOR.
ROMAN C. RUHLAND
BY George H. Fisher
ATTORNEY 2,728,042
Patented Dec. 20, 1955

2,728,042

CONTROL CIRCUITS

Roman C. Ruhland, St. Louis Park, Minn., assignor to Minneapolis-Honeywell Regulator Company, Minneapolis, Minn., a corporation of Delaware Application December 24, 1951, Serial No. 263,057
11 Claims. (Cl. 321—8)

Figure 1:
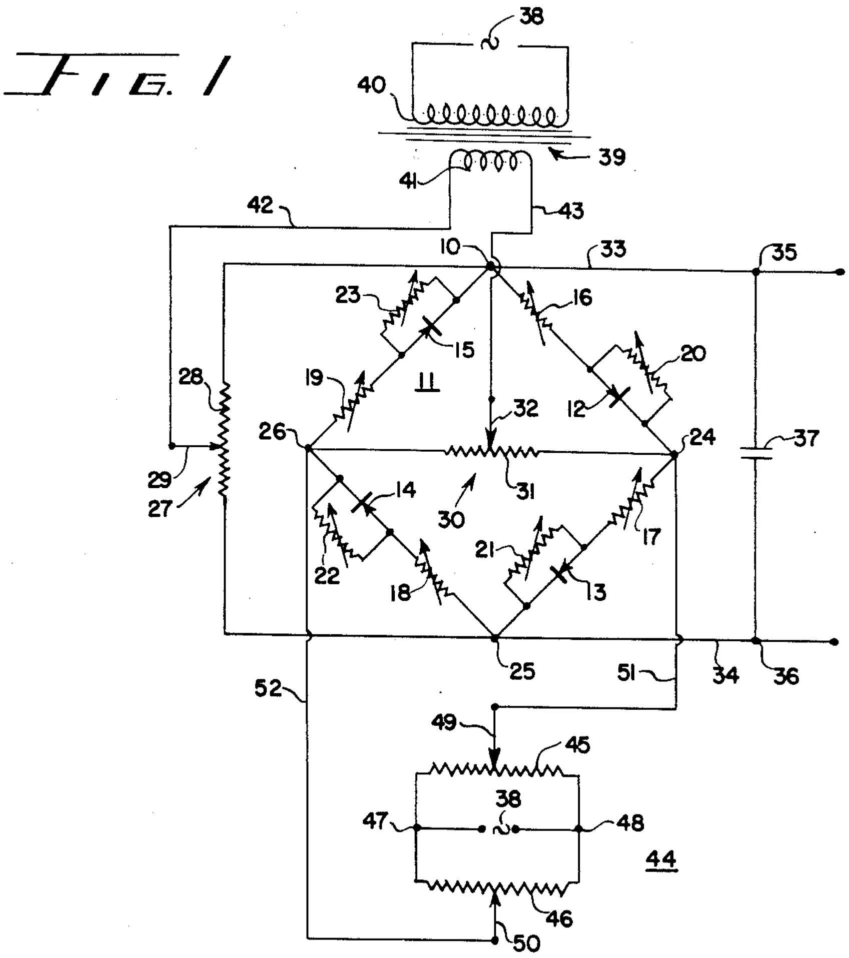
Figure 1A:
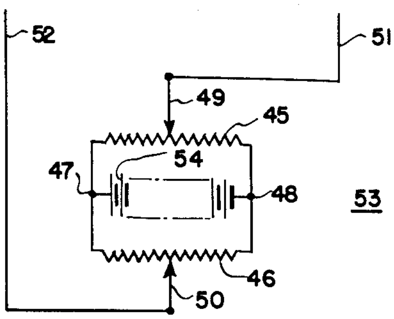

My invention relates to control circuits and more particularly to control circuits which contain a bridge circuit composed of rectifiers. It is well known by those skilled in the art that a desirable characteristic of certain types of bridge circuits is that they may be easily balanced or brought to a state of equilibrium. In a bridge composed of stable and readily adjustable elements, it is relatively simple to effect a state of balance. However, in a bridge composed of relatively unadjustable elements such as rectifiers, it often becomes difficult to effect a balance due to slight inherent differences in the electrical characteristics of the rectifiers. The procedure in assembling such a bridge is to attempt to select elements that match one another in electrical characteristics. It follows that where it is desired to have a very high degree of stability in balance, the selection of matched elements becomes a more complex problem. The problem of selecting matched elements is further aggravated by another characteristic of rectifiers. This is associated with the fact that rectifiers have a low forward impedance and a high back or reverse impedance. In the selection of a pair of matching rectifiers, if the forward impedance of the two rectifiers are equal or approximately so, it doesn't necessarily follow that their reverse or back impedance will be equal. It is often found in practice that while one rectifier may have a lower forward impedance than a second, its reverse or back impedance may be higher than the second. It is obvious, then, that the matching of two elements, each having two variables, to a high degree of similarity is a costly operation.

It is therefore an object of my invention to improve bridge circuits containing rectifiers by providing a simple and positive method of equalizing or stabilizing the circuit without a laborious and expensive assembling procedure.

It is a further object to provide in a bridge circuit containing rectifiers means whereby the bridge may be rebalanced and restabilized at any time after the initial assembly should the bridge become unbalanced or unstabilized due to the changing of the electrical characteristics of the bridge components in the course of time and operation.

Another object of my invention is to provide a method of matching the electrical characteristics of two or more rectifiers in such a way that the means used to equalize the forward impedance does not appreciably effect the reverse or back impedance and also that the means used to equalize the reverse impedance does not appreciably effect the forward impedance.

Still another object of my invention is to provide a method of adjusting the impedance of a rectifier in the direction of the greatest conductivity without effecting the impedance of the rectifier in the direction of least conductivity and also to adjust the impedance of a rectifier in the direction of least conductivity without effecting the impedance of the rectifier in the direction of greatest conductivity.

The attainment of the above and further objects of my invention will be apparent from the following specification taken in conjunction with the drawings forming a part thereof in which:

Figure 1 is a schematic diagram of a control circuit embodying my invention; and Figure 1–A is a schematic diagram of a modification of part of the diagram shown in Figure 1.

Reference may now be had to Figures 1 and 1–A wherein I have illustrated my invention as applied to a known control circuit commonly termed a "ring modulator." As is well known by those skilled in the art a "ring modulator" is a device that in one application produces a direct current output voltage that varies in magnitude and in polarity in accordance to the magnitude and phase relationship respectively of an alternating current control voltage. A "ring modulator" can also be used to produce an alternating current voltage that varies in magnitude and phase relationship in accordance to the magnitude and polarity respectively of a direct current control voltage.

The application of my invention to a "ring modulator" that develops a direct current output voltage in accordance to the variations of an alternating current control voltage is illustrated in Figure 1 wherein is shown a "ring" or bridge 11 comprising rectifiers 12, 13, 14, and 15 connected as in the four arms of a bridge circuit and in such a way so that all conduct current in the same direction about the bridge 11.

Connected in series relationship with each of rectifiers 12, 13, 14, and 15 in their respective arms of bridge 11 are variable resistors 16, 17, 18, and 19 respectively. Additional variable resistors 20, 21, 22, and 23 are connected in shunting relationship with rectifiers 12, 13, 14, and 15 respectively. The function and purpose of variable resistors 16 to 23, being the essential element of my invention, will be explained and discussed at length in the description of the operation of the control circuit shown in Figure 1.

The four arms of bridge 11 are joined at four junction points 10, 24, 25, and 26.

Connected across the diagonals of bridge 11 to juncton points 10 and 25, and to junction points 24 and 26 respectively are potentiometer 27 comprising a resistance 28 and a slider 29, and potentiometer 30 comprising a resistance 31 and a slider 32.

Also connected to the junction points 10 and 25 are leads 33 and 34 which serve as output terminals for bridge 11.

Connected to points 35 and 36 on output leads 33 and 34 is a capacitor 37 which tends to filter out the ripple component in the direct current output voltage developed by the "ring modulator."

A first input voltage to bridge 11 is an alternating current excitation voltage of constant magnitude and fixed phase relationship that is induced in the secondary winding 41 of transformer 39 whose primary winding 40 is energized by a source of alternating current voltage 38 and is impressed on sliders 29 and 32 of potentiometers 27 and 30 by connecting leads 42 and 43. In this respect sliders 29 and 32 constitute a first set of input terminals to bridge 11.

A second input voltage to bridge 11 is an alternating current voltage of variable magnitude and reversible phase. This second input voltage representing a control or measurement voltage is developed in network 44 comprising resistors 45 and 46 joined to one another at junction points 47 and 48. The resistors 45 and 46 have sliders 49 and 50 respectively. The sliders 49 and 50 on resistors 45 and 46 are in turn connected to junction points 24 and 26 respectively of bridge 11 by connecting leads 51 and 52. In this respect junction points 24 and 26 constitute a second set of input terminals to bridge 11. The source of alternating current 38 is applied to the junction points 47 and 48 of network 44. It is to be understood in the operation of network 44 that if sliders 49 and 50 are positioned at the mid points of their respective resistances 45 and 46 there will be no potential difference between the sliders 49 and 50 and consequently a control voltage of zero magnitude will be applied at junction points 24 and 26 of bridge 11. However, an alternating current control voltage of variable magnitude and reversible phase will be developed in network 44 and applied to junction points 24 and 26 of bridge 11 in accordance to what extent and in what direction sliders 49 and 50 are moved along their respective resistances 45 and 46. It follows that if slider 49 was moved to the extreme right side of resistance 45 while at the same time slider 50 was moved to the extreme left side of resistance 46, a control voltage of maximum magnitude and of one phase would be applied to junction points 24 and 26 of bridge 11. Conversely, to obtain a control voltage of maximum magnitude but of the opposite phase to that just described, slider 49 would have to be moved to the extreme left side of resistance 45 and slider 50 would have to be moved to the extreme right side of resistance 46. It is obvious that between the two control voltages of maximum magnitude but of opposite phase are an infinite number of control voltages whose magnitude and phase depend upon the position of sliders 49 and 50. It should be understood that network 44 is merely one of many methods of producing a control or measurement voltage to be applied to the second set of input terminals 24 and 26 of bridge 11, and that it in no way should restrict the scope of my invention.

*Operation*

The operation of a conventional "ring modulator" is well known by those skilled in the art, and a detailed account of its operation is not necessary to describe my invention. One patent that does describe a "ring modulator" having a direct current output voltage is the Ludbrook Patent 2,380,251. For purposes of describing my invention, the following account of the basic operation of a "ring modulator" is sufficient.

As stated above a first input or constant excitation voltage is applied to a first set of input terminals which are sliders 29 and 32 on resistances 28 and 31 connected across the diagonals of bridge 11. A second input or control voltage that is developed in network 44 is applied to a second set of input terminals which are junction points 24 and 26 of bridge 11. An output voltage is developed at output terminals 33 and 34 which is a direct current voltage that varies in magnitude and in polarity in accordance to the magnitude and phase relationship of the control voltage applied to junction points 24 and 26 of bridge 11. The direct current output voltage developed at output terminals 33 and 34 is produced by virtue of the interaction of the excitation and control voltages on the resistors 28 and 31 connected across the diagonals of bridge 11. The exact manner in which this is achieved since it is not the subject of my invention, will not be elaborated upon for the purpose of brevity. It is sufficient to state that the operation of a "ring modulator" is largely dependent upon a balanced relationship of the impedances of the opposite arms of the "ring" or as in Figure 1, bridge 11. The reason for this is that, unless the opposite arms are in a balanced relationship with one another, the output voltage will not be a true indication of the sense of the control voltage. For example, if the bridge is not balanced, then an appreciable output voltage will appear when the control voltage is zero, and for other values of the control voltage, the magnitude of the output voltage will not be proportional to the magnitude of the control voltage. However, when the bridge 11 is in a perfectly balanced state and the control voltage is zero, the effect of the first input or excitation voltage impressed on bridge 11 is cancelled out and no output voltage will appear at the output terminals 33 and 34.

Since there should be no output voltage when the control voltage is zero and since the magnitude of the output voltage should always be proportional to the magnitude of the control voltage, it will be appreciated how important the balance of the "ring" or bridge is in relation to the operation of a "ring modulator." I have found in applications of the conventional "ring modulator" where great sensitivity is required, that it is impossible to obtain a balanced condition in the bridge 11 due to differences in the forward and reverse impedances of the rectifiers 12, 13, 14, and 15. In other words, I found that I did not obtain an output voltage that varied exactly in accordance to the control voltage, and I did not get the desired null or zero output voltage for a zero magnitude control voltage. It will be appreciated from a study of Figure 1 that in order to have a balanced condition of bridge 11 the forward and reverse impedances of rectifier 12 must be exactly equal to the forward and reverse impedances respectively of rectifier 14, and also the forward and reverse impedances of rectifier 13 must be exactly equal to the forward and reverse impedances respectively of rectifier 15. I have stated above the difficulties involved in obtaining two or more rectifiers having exactly equal forward impedances while at the same time having exactly equal reverse impedances. Even so-called "factory matched" rectifiers are unsatisfactory in a sensitive bridge.

I have found that it is possible to obtain a perfect balance in a bridge circuit containing rectifiers such as in bridge 11 by using variable resistors to compensate for the differences in the impedances in the rectifiers. For example to equalize or to compensate for the difference in the forward impedances of the pair of rectifiers 12 and 14, I have inserted in series with each of rectifiers 12 and 14 a variable resistor 16 and 18. In the calibration of bridge 11, if the forward impedance of rectifier 12 is found to be greater than the forward impedance of rectifier 14, then variable resistors 16 and 18 are adjusted so that variable resistance 18 is greater than variable resistance 16 to the extent that the difference of resistance between variable resistors 18 and 16 is equal to the difference between the forward impedances of rectifiers 12 and 14. In other words, the variable resistors 16 and 18 are adjusted until the forward impedance of the arm of bridge 11 containing rectifier 12 is exactly equal to the forward impedance of the arm containing rectifier 14. By a similar adjustment of variable resistors 17 and 19, the forward impedance of the arms of bridge 11 containing rectifiers 13 and 15 are made exactly equal. It follows naturally that if the approximate values of the forward impedances of a pair of rectifiers were known prior to the assembly of the bridge 11, then it would be possible to eliminate one of the two variable resistors used to compensate for the difference in the forward impedance of the pair of rectifiers. For example, if it were known that the forward impedance of rectifier 12 was greater than the forward impedance of rectifier 14, then it would be unnecessary to use variable resistor 16, and only variable resistor 18 would be required, it being adjusted so that its value plus the forward impedance of rectifier 14 equaled the forward impedance of rectifier 12.

To equalize or to compensate for the difference in the reverse impedance of rectifiers 12 and 14, I have connected in parallel with each of rectifiers 12 and 14 a variable resistor 20 and 22. In the calibration of bridge 11, if the reverse impedance of rectifier 12 is found to be greater than the reverse impedance of rectifier 14, then variable resistors 20 and 22 are adjusted so that the variable resistor 20 is less than the variable resistor 22 to the extent that the parallel combination of rectifier 12, in the sense of its reverse impedance, and variable resistor 20 is exactly equal to the parallel combination of rectifier 14, in the sense of its reverse impedance, and variable resistor 22. In other words, the variable resistors 20 and 22 are adjusted until the reverse impedance of the arm of bridge 11 containing rectifier 12 is exactly equal to the reverse impedance of the arm of the bridge containing rectifier 14. By a similar adjustment of variable resistors 21 and 23, the reverse impedances of the arms of bridge 11 containing rectifiers 13 and 15 are made exactly equal.

It also follows logically that if the approximate values of the reverse impedances of a pair of rectifiers were known prior to the assembly of the bridge 11, then it would be possible to eliminate one of the two variable resistors used to equalize the difference in the reverse impedance of the pair of rectifiers. That is, if it were known that the reverse impedance of rectifier 12, for example, was greater than the reverse impedance of rectifier 14, then it would be unnecessary to use variable resistor 22, and only variable resistor 20 would be required, it being adjusted so that the parallel combination of it and the reverse impedance of rectifier 12 would be equal to the reverse impedance of rectifier 14.

I have shown in the embodiment of my invention in each arm of bridge 11 an adjustable resistor in series with the rectifier and an adjustable resistor in parallel or in shunting relationship with the rectifier. The reason for this is to positively cope with all of the possible combinations of forward and reverse impedances in a pair of rectifiers. As stated before, if the forward and reverse impedances of the rectifiers may be approximately determined prior to the assembly of the bridge, it is then possible to eliminate one of the two adjustable resistors used to equalize the difference in the forward impedances of the pair of rectifiers and one of the two adjustable resistors used to equalize the difference in the reverse impedances of the pair of rectifiers. Also, in view of the fact that in a pair of rectifiers, one rectifier may have a higher forward impedance than the second but have a lower reverse impedance than the second, it would be entirely within the scope of my invention to have one arm of bridge 11 containing only a rectifier and to have a matching arm of bridge 11 containing in addition to a rectifier both a series resistor equalizing the difference in the forward impedances of the pair of rectifiers and a shunting resistor in parallel to the rectifier equalizing the difference in reverse impedances of the rectifiers.

One of the advantages of my method of balancing the bridge 11 is that the series adjustable resistors 16, 17, 18, and 19 have negligible effect of the reverse impedance of their respective arms of the bridge 11 and likewise, the shunting adjustable resistors 20, 21, 22, and 23 have negligible effect on the forward impedance of their respective arms of the bridge. The reason for this is that since the forward impedances of rectifiers is relatively low, the values of the series adjustable resistors equalizing the difference in the forward impedances will be of a low value, and also since the reverse impedances of rectifiers is relatively high, the values of the shunting adjustable resistors equalizing the difference in the reverse impedances will be of a relatively high value. Thus, while series adjustable resistors 16, 17, 18, and 19 are effective in equalizing the difference in the forward impedances of their respective arms of bridge 11, they are so much lower a value of resistance than the reverse impedance of their respective rectifiers that they have a negligible effect on the over-all reverse impedance of their respective arms of the bridge. Further, while shunting adjustable resistors 20, 21, 22, and 23 are effective in equalizing the difference in the reverse impedances of the rectifiers in their respective arms of bridge 11, they are so much higher a value of resistance than the forward impedance of their respective rectifiers that they have a negligible effect on the overall forward impedance of their respective arm of the bridge.

Another advantage of my invention is that should bridge 11 become unbalanced due to the effects of time and operation at some period subsequent to the initial calibration, it is only necessary to readjust the variable resistors 16 to 23 in order to bring the bridge back to balance.

The application of my invention to a "ring modulator" that develops an alternating current output voltage in accordance to the variation of a direct current control voltage in general requires the same bridge circuit as shown in Figure 1 but with the network 44 being replaced by network 53 as shown in Figure 1–A and with capacitor 37 eliminated. Network 53 receives energization from battery 54 and depending upon the relative position of sliders 49 and 50 on resistors 45 and 46, a direct current control or measurement voltage of variable magnitude and reversible polarity will be applied to the second set of input terminals to bridge 11, junction points 24 and 26. An alternating current output voltage will be developed at the output terminals 33 and 34 whose magnitude and phase relationship varies in accordance to the magnitude and polarity respectively of the direct current control voltage developed in network 53 and applied to the input terminals 24 and 26 by means of connecting leads 51 and 52. The manner in which this circuit works is similar in most respects to the "ring modulator" first described, except of course that instead of an alternating current control voltage and a direct current output voltage, this circuit utilizes a direct current control voltage and produces an alternating current output voltage. Again for purposes of brevity, the detailed operation of this type of "ring modulator" is omitted since it is not necessary to explain the invention. One patent that describes in detail the conventional "ring modulator" having an alternating current output voltage is the Ludbrook Patent 2,316,008. For purposes of describing my invention, it is sufficient to state that for proper operation it is essential that the bridge 11 be exactly balanced in the sense that its matching arms be exactly equal from both a forward and reverse impedance standpoint. Adjustable resistors 16 to 23 are used as in the first application to balance bridge 11.

It is to be understood that the invention is not to be limited to the precise embodiment here shown and described, the same merely illustrating the principles of the invention. Variations may be made without departing from the scope of the invention as it is described in the following claims.

I claim as my invention:

1. In combination, a control circuit comprising a bridge circuit comprising four rectifiers connected as in the four arms of a bridge so as to conduct current in the same direction about said bridge circuit, impedances connected across both diagonals of said bridge circuit, said impedances having sliders associated therewith, a first set of input terminals connected to said sliders on said impedances, a second set of input terminals connected to the extremities of the first of said impedances, output terminals connected to the extremities of the second of said impedances, means to supply a first input voltage to said first set of input terminals, means to supply a second input voltage to said second set of input terminals, said first input voltage being an alternating excitation voltage, said second input voltage being a measurement or control voltage which varies in magnitude and reverses in sense, and means for compensating said bridge circuit for differences in the impedances of said rectifiers, said compensating means comprising at least one impedance of low value in series with at least one of said rectifiers and at least one impedance of high value in parallel with at least one of said rectifiers.

2. In combination, a control circuit comprising a bridge circuit comprising four rectifiers connected as in the four arms of a bridge so as to conduct current in the same direction about said bridge circuit, impedances connected across both diagonals of said bridge circuit, said impedances having sliders associated therewith, a first set of input terminals connected to said sliders on said impedances, a second set of input terminals connected to the extremities of the first of said impedances, output terminals connected to the extremities of the second of said impedances, means to supply a first input voltage to said first set of input terminals, means to supply a second input voltage to said second set of input terminals, said first input voltage and said second input voltage being alternating voltages of the same frequency, said first input voltage being an excitation voltage of relatively constant character, said second input voltage being a measurement or control voltage that varies in magnitude and varies in phase relationship as compared to said first input voltage, and means for compensating said bridge circuit for differences in the impedances of said rectifiers, said compensating means comprising at least one impedance of low value in series with at least one of said rectifiers and at least one impedance of high value in parallel with at least one of said rectifiers, said output terminals having a direct current output voltage developed therebetween which varies in magnitude and in polarity in response to the variations of the magnitude and phase relationship of said second input voltage.

3. In combination, a control circuit comprising a bridge circuit comprising four rectifiers connected as in the four arms of a bridge so as to conduct current in the same direction about said bridge circuit, impedances connected across both diagonals of said bridge circuit, said impedances having sliders associated therewith, a first set of input terminals connected to said sliders on said impedances, a second set of input terminals connected to the extremities of the first of said impedances, output terminals connected to the extremities of the second of said impedances, means to supply a first input voltage to said first set of input terminals, means to supply a second input voltage to said second set of input terminals, said first input voltage being an alternating excitation voltage, said second input voltage being a direct current measurement or control voltage which varies in magnitude and polarity, and means for compensating said bridge circuit for differences in the impedances of said rectifiers, said compensating means comprising at least one impedance of low value in series with at least one of said rectifiers and at least one impedance of high value in parallel with at least one of said rectifiers, said output terminals having an alternating current output voltage developed therebetween which varies in magnitude and varies in phase relationship with said first input voltage in accordance to the magnitude and polarity of said second input voltage.

4. In combination, a control circuit comprising in part a bridge circuit, said bridge circuit containing four rectifiers interconnected so as to conduct current in the same direction, means consisting of two impedances connected to the diagonals of said bridge, said impedances having sliders associated therewith, bridge balancing means consisting of variable impedance means connected in a serial relationship with at least one of said rectifiers, said bridge balancing means being applied to equalize and to compensate for differences in the forward impedances of said rectifiers, a first source of input voltage applied to the extremities of the first of said impedances, output terminals connected to the extremities of the second of said impedances, and a second source of input voltage applied to said sliders on said impedances, one of said input voltages being of a relatively constant character, the other of said input voltages being a control voltage of variable character, said output terminals having an output voltage developed therebetween in accordance to the variations of said control voltage.

5. In combination, a control circuit comprising in part a bridge circuit, said bridge circuit containing four rectifiers interconnected so as to conduct current in the same direction, means consisting of two impedances joining the non-adjacent rectifiers of said bridge, said impedances having sliders associated therewith, bridge balancing means consisting of variable impedance means connected in a shunting relationship with at least one of said rectifiers, said bridge balancing means being applied to equalize and to compensate for differences in the reverse impedances of said rectifiers, a first source of input voltage applied to the extremities of the first of said impedances, output terminals connected to the extremities of the second of said impedances, and a second source of input voltage applied to said sliders on said impedances, one of said input voltages being of a relatively constant character, the other of said input voltages being a control voltage of variable character, said output terminals having an output voltage developed therebetween in accordance to variations of said control voltage.

6. In combination, a balanced network having a rectifier in each of two portions of said network so that the balance of said network is affected by the relative impedances of said rectifiers, first adjustable means serially connected with said rectifiers for compensating for differences in the magnitude of the forward impedances of said rectifiers without appreciably altering the relative effects of the back impedances of said rectifiers, and second adjustable means connected in shunting relationship with at least one of said rectifiers for compensating for differences in the magnitude of the back impedances of said rectifiers without appreciably affecting the relative effects of the forward impedances of the rectifiers.

7. In combination, a balanced network having a rectifier in each of two portions of said network so that the balance of said network is affected by the relative impedances of said rectifiers, and adjustable means serially connected with said rectifiers for compensating for differences in the magnitude of the forward impedances of said rectifiers without appreciably altering the relative effects of the back impedances of said rectifiers.

8. In combination, a balanced network having a rectifier in each of two portions of said network so that the balance of said network is affected by the relative impedances of said rectifiers, and adjustable means connected in shunting relationship with at least one of said rectifiers for compensating for differences in the magnitude of the back impedances of said rectifiers without appreciably altering the relative effects of the forward impedances of said rectifiers.

9. In combination with a bridge circuit comprising in part rectifiers, said bridge circuit being affected by the relative impedances of said rectifiers, first means serially connected with said rectifiers for compensating for differences in the magnitude of the forward impedances of said rectifiers without appreciably altering the relative effects of the back impedances of said rectifiers, and second means connected in shunting relationship with at least one of said rectifiers for compensating for differences in the magnitude of the back impedances of said rectifiers without appreciably affecting the relative effects of the forward impedances of said rectifiers.

10. In combination, a bridge circuit comprising at least one pair of rectifiers, said bridge circuit being affected by the relative impedances of said pair of rectifiers, first means serially connected with said rectifiers for compensating for differences in the magnitude of the forward impedances of said pair of rectifiers without appreciably altering the relative effects of the back impedances of said pair of rectifiers, and second means connected in shunting relationship with at least one of said pair of rectifiers for compensating for differences in the magnitude of the back impedances of said pair of rectifiers without appreciably affecting the relative effects of the forward impedances of said pair of rectifiers.

11. In combination, a bi-directional electrically conductive device, said device having a substantially greater conductivity in a first direction of current flow than in the other direction of current flow, first means serially connected with said device to adjust the impedance of said device in said first direction of current flow without appreciably altering the impedance of said device in said other direction of current flow, and second means connected in shunting relationship with said device to adjust the impedance of said device in said other direction of current flow without appreciably altering the impedance of said device in said first direction of current flow.

References Cited in the file of this patent

UNITED STATES PATENTS

| | | |
|---|---|---|
| 2,016,148 | La Roque et al. | Oct. 1, 1935 |
| 2,148,718 | Agins | Feb. 28, 1939 |
| 2,270,697 | Clark | Jan. 20, 1942 |
| 2,554,778 | Erickson | May 29, 1951 |